United States Patent

[11] 3,565,206

| [72] | Inventor | Basil J. Managhan<br>769 Main St. Jackson Apt. Room 506,<br>Worcester, Mass. 01608 |
|---|---|---|
| [21] | Appl. No. | 840,228 |
| [22] | Filed | July 9, 1969 |
| [45] | Patented | Feb. 23, 1971 |

[54] SAFETY DEVICE FOR UNAUTHORIZED USE OF AUTOMOTIVE VEHICLES AND THE LIKE
4 Claims, 1 Drawing Fig.

[52] U.S. Cl. ............................................. 180/110,
180/114, 200/56
[51] Int. Cl. ............................................. B60r 25/04
[50] Field of Search ................................ 180/110,
82 (NA), 114; 200/56, 80; 340/263, 266

[56] References Cited
UNITED STATES PATENTS

| 1,638,836 | 8/1927 | Davis et al. ............ | 180/110 |
| 2,167,092 | 7/1939 | Thomas .................. | 200/56 |
| 2,181,429 | 11/1939 | Hansen .................. | 180/110 |
| 2,728,072 | 12/1955 | Magid .................... | 340/266 |
| 2,785,245 | 3/1957 | Kelsay .................... | 200/80 |
| 2,880,288 | 3/1959 | Rosenberg ............... | 340/263X |
| 2,843,687 | 7/1958 | Murphy ................... | 200/56 |
| 2,920,154 | 1/1960 | Allen ...................... | 200/56 |

Primary Examiner—Kenneth H. Betts

ABSTRACT: This invention consists of a hard S-shaped spring having one end suitably secured to the rotating shaft of the speed indicating arm of a speedometer. The other or free end of the aforesaid S-shaped spring is provided with a U-shaped member adapted to engage a roller that is located on the outer end of the arm of an electric switch that is connected into the electric ignition system of an automotive vehicle. The engagement of the outer end of the S-shaped spring takes place when the vehicle has reached a predetermined speed and the shaft of the speedometer has rotated to a predetermined position. A spring-loaded pushbutton is used to activate a swing arm that will reset the safety device by pressing against the aforesaid S-shaped spring, as will hereinafter be described.

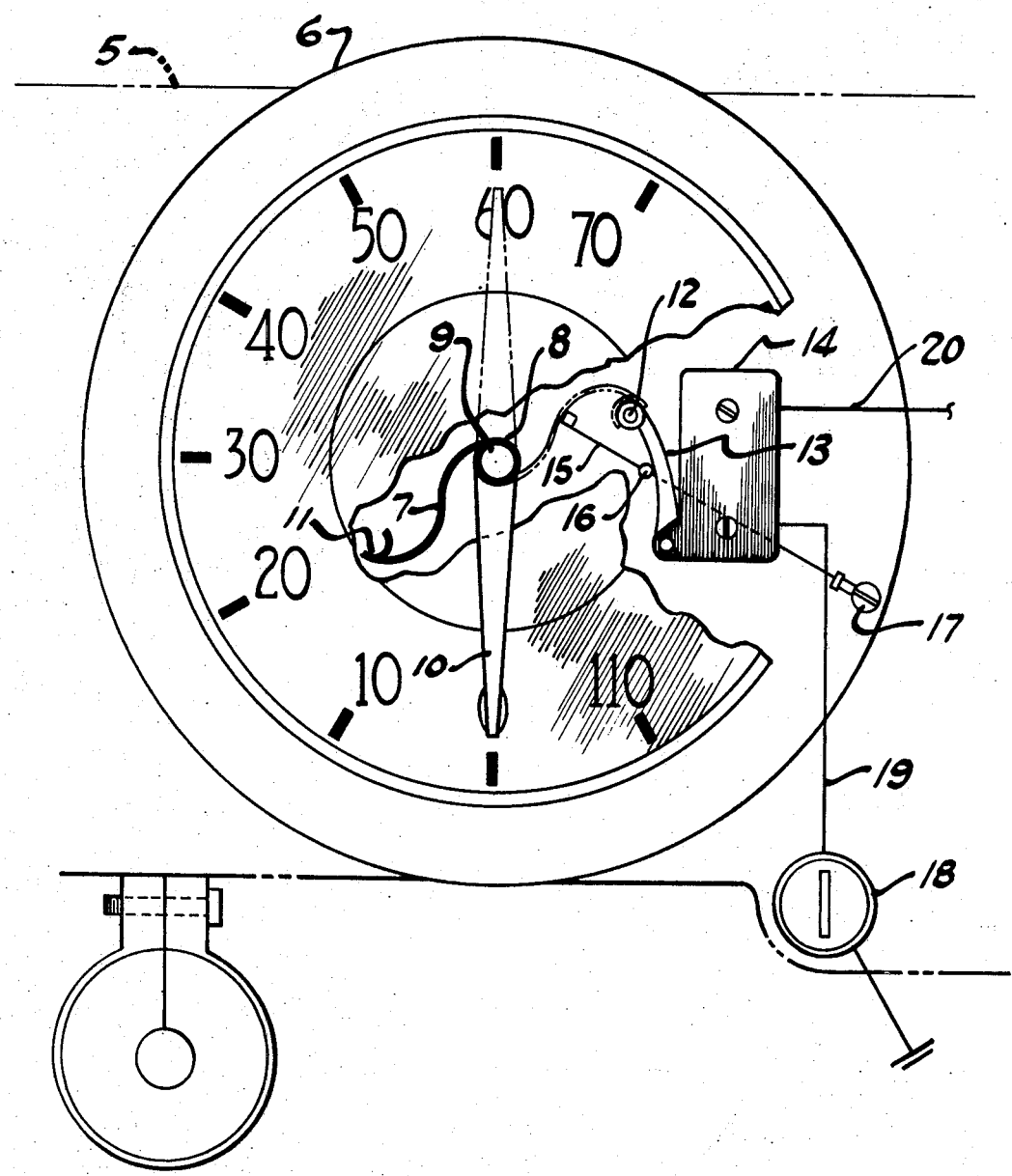
INVENTOR
BASIL J. MANAGHAN

SAFETY DEVICE FOR UNAUTHORIZED USE OF AUTOMOTIVE VEHICLES AND THE LIKE

This invention relates to safety devices; more particularly, to a safety device adapted to an automotive vehicle or the like; still more particularly, to a safety device that is incorporated into, or attached to, the speedometer of a passenger carrying automobile, truck, or motorcycle although it can also be used in connection with speed indicating devices for boats or even adapted to the tachometer of any engine, if it is so desired to prevent the engine from being used by any unauthorized person.

It is the principal object of this invention to provide a safety device for unauthorized use of automotive vehicles and the like, the device automatically turning off the ignition of the engine when the vehicle is driven above a predetermined speed.

Another object of this invention is to provide a safety device for unauthorized use of automotive vehicles and the like that is so located and constructed that the device is neither visible to anyone in the vehicle nor can the device be removed from the vehicle without previous knowledge of its mechanism and/or construction.

Still another object of this invention is to provide a safety device for unauthorized use of automotive vehicles and the like that can be either manufactured with the speedometer or adapted for attachment to nearly any speedometer or tachometer already in an automobile or the like.

Other and further objects and advantages of this invention will no doubt appear as the reading of this specification and its appended claims proceeds in connection with an examination of the appended drawing, in which the single FIGURE clearly illustrates the preferred form of this invention.

Directing one' ATTENTION TO THE ACCOMPANYING DRAWING IT WILL BE SEEN THAT THERE IS HEREIN ILLUSTRATED THE FRONT OF THE DASHBOARD 5 OF AN AUTOMOTIVE VEHICLE. THE AFORESAID DASHBOARD HAS A TYPICAL SPEEDOMETER 6 MOUNTED THEREON. THE SPEEDOMETER IN THE ILLUSTRATION HAS BEEN BROKEN OPEN IN PART IN ORDER TO CLEARLY SHOW THE MECHANICAL AND ELECTRICAL MECHANISM THAT GOES TO MAKE UP THIS NOVEL INVENTION WHICH WILL NO DOUBT CONTRIBUTE TOWARD THE REDUCTION IN THE EVER ALARMING NUMBER OF AUTOMOTIVE VEHICLES THAT ARE TAKEN FOR UNAUTHORIZED USE EACH YEAR.

The aforesaid mechanism embodies a hard S-shaped spring 7 that has one end 8 suitably secured to the rotating shaft 9 of the aforesaid speedometer 6. When the speed indicating arm 10 of the speedometer points to a predetermined speed at which the vehicle is travelling, the U-shaped member located on the outer end of spring 7 will have been rotated to a point where the aforesaid U-shaped member 11 will partly encompass the roller 12. Roller 12 is located on the outer end of arm 13 of the electric switch 14. A swing arm 15, that is pivotally secured at 16 to the aforesaid speedometer, is operated by a spring-loaded pushbutton 17 to release the just-mentioned arm 13 of the switch 14 in order to reset the previously mentioned S-shaped spring 7 of this invention to the starting position shown in solid black lines in the accompanying drawing.

The way in which this novel invention works is almost self-explanatory when one examines the accompanying drawing. Here it is seen that when the invention is assembled on the back of the aforesaid speedometer 6, and the end 8 of the S-shaped spring 7 is secured to the rotating shaft 9 in a position determined to cause the aforesaid U-shaped member 11 on the outer (free) end of spring 7 to rotate around until the U-shaped member comes in contact with the roller 12, due to the relative positions of shaft 9 and the position of the pivot of switch arm 13, pressure of the U-shaped member on roller 12 rotates switch arm 13 in a counterclockwise direction to open the contacts of switch 14. Elements 7, 9, 11, 12, 13 and the contacts remain in this position until manually restored. This breaks the electric circuit and thus causes the vehicle to stop. The just-mentioned action will be fully understood when it is realized that electric current flows to the ignition switch 18 from the aforesaid switch 14 through the wire 19; switch 14 being connected in the electric system of the automotive vehicle by means of wire 20. When it is desired to start and move the automotive vehicle, all one who knows of this device has to do is to press the aforesaid spring-loaded pushbutton 17, which obviously will be unmarked on the aforesaid dashboard 6 of the car or the like.

Elements 15 and 16 are a conventional showing of mechanism operated by a pushbutton device for pushing elements 7 and 11 away from roller 12, thus permitting switch arm 13 to return to a position in which switch 14 is closed, also permitting S-shaped arm 7 rotating shaft 9, and indicating arm 10 to return to zero position. The often-mentioned S-shaped spring 7 is shown in the switch opening position by means of dash lines in the accompanying drawing. In the drawing, the speed indicating arm 10 is likewise shown in dash lines indicating the speed at which it is desired to cause the vehicle to come to a stop.

This invention of a safety device is subject to any and all changes and/or modifications that one may care to make in the same in so long as the changes and/or modifications fall within the scope and intent of the appended claims.

This invention can also be adapted to mounting on the rotating shaft of speedometers that rotate a dial in place of an indicating arm. The invention can also be adapted to the rotating shaft of nearly any type of tachometer, if it is so desired. The safety device can be so enclosed in the case of the speedometer or its equivalent that, even if it is located, it will be next to impossible for the device to be disconnected without destroying the speedometer and/or the ignition switch of the automotive vehicle.

I claim:

1. A safety device for preventing unauthorized use of an automotive vehicle, comprising a speedometer for said vehicle, said speedometer having a rotating speed-indicating member mounted on a rotating shaft, a movable structure secured to said shaft, a switch secured to a stationary part of said speedometer, said switch having normally closed ignition circuit contacts and a pivoted switch arm extending into the path of the outer end of said movable structure and cooperating means on the movable structure and switch arm to move the switch arm to contact opening position when said speed indicating member is moved to a position to indicate a predetermined maximum speed, said means keeping said movable structure, switch arm and contacts in contact opening position until manually released.

2. The invention of claim 1, wherein the said movable structure is in the form of an S-shaped spring that has one end secured to said shaft, the other end of said spring being secured to a portion of said cooperating means.

3. The invention of claim 1 wherein said cooperating means comprises a member U-shaped in configuration secured to said other end of said S-shaped spring, and a roller secured to the free end of said switch arm.

4. The invention of claim 3 wherein the safety device includes mechanism operable to reset said safety device to permit said contacts to return to closed position.